(12) United States Patent
Mamada

(10) Patent No.: US 9,644,557 B2
(45) Date of Patent: May 9, 2017

(54) HYBRID VEHICLE AND METHOD OF CONTROLLING HYBRID VEHICLE

(71) Applicant: Yusuke Mamada, Toyota (JP)

(72) Inventor: Yusuke Mamada, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 903 days.

(21) Appl. No.: 14/031,909

(22) Filed: Sep. 19, 2013

(65) Prior Publication Data

US 2014/0107910 A1    Apr. 17, 2014

(30) Foreign Application Priority Data

Oct. 11, 2012   (JP) ................................. 2012-225796

(51) Int. Cl.
*F02D 41/06* (2006.01)
*F02D 41/04* (2006.01)
(Continued)

(52) U.S. Cl.
CPC ............ *F02D 41/062* (2013.01); *B60K 6/445* (2013.01); *B60L 11/123* (2013.01); *B60L 11/14* (2013.01); *B60L 15/20* (2013.01); *B60L 15/2054* (2013.01); *B60W 10/06* (2013.01); *B60W 20/10* (2013.01); *F02D 41/042* (2013.01); *F02D 41/045* (2013.01); *F02D 41/065* (2013.01); *F02N 11/0822* (2013.01); *B60L 2210/10* (2013.01); *B60L 2210/40* (2013.01); *B60L 2240/12* (2013.01); *B60L 2240/421* (2013.01); *B60L 2240/423* (2013.01); *B60L 2240/441* (2013.01); *B60L 2240/443* (2013.01); *B60L 2240/486* (2013.01); *B60L 2250/26* (2013.01);
(Continued)

(58) Field of Classification Search
CPC ......... B60W 2050/0008; B60W 20/10; B60W 20/40; F02D 17/04; F02D 41/06; F02D 41/062; F02D 41/065; F02N 11/0803; F02N 11/0814; F02N 11/0829; F02N 2019/002; F02M 69/30; F02M 59/447
See application file for complete search history.

(56) References Cited

U.S. PATENT DOCUMENTS 6,700,213 B1    3/2004   Wakashiro et al.
2008/0092841 A1*  4/2008   Takahashi ............. F02D 41/009
                                                                    123/179.16

(Continued)

FOREIGN PATENT DOCUMENTS

CN          1295948 A       5/2001
JP         A-6-233411       8/1994
(Continued)

*Primary Examiner* — Erick Solis
*Assistant Examiner* — Anthony L Bacon
(74) *Attorney, Agent, or Firm* — Oliff PLC

(57) ABSTRACT

A hybrid vehicle includes: an engine, a motor configured to drive the vehicle, an air-fuel ratio sensor, and a control unit configured to stop and start the engine according to vehicle required power. The control unit is configured to change a threshold value of the vehicle required power at which the engine is started such that a difference between an air-fuel ratio detected by the air-fuel ratio sensor and a stoichiometric air-fuel ratio decreases in a case where the difference exceeds a predetermined value when the engine is stopped.

5 Claims, 5 Drawing Sheets

(51) Int. Cl.

| | | |
|---|---|---|
| *F02N 11/08* | (2006.01) | |
| *B60K 6/445* | (2007.10) | |
| *B60W 10/06* | (2006.01) | |
| *B60W 20/10* | (2016.01) | |
| *B60L 11/12* | (2006.01) | |
| *B60L 11/14* | (2006.01) | |
| *B60L 15/20* | (2006.01) | |
| *F02N 19/00* | (2010.01) | |

(52) U.S. Cl.
CPC .. *B60L 2260/26* (2013.01); *B60W 2510/0619* (2013.01); *F02N 2019/002* (2013.01); *F02N 2200/101* (2013.01); *Y02T 10/48* (2013.01); *Y02T 10/6217* (2013.01); *Y02T 10/6239* (2013.01); *Y02T 10/645* (2013.01); *Y02T 10/7077* (2013.01); *Y02T 10/7216* (2013.01); *Y02T 10/7241* (2013.01); *Y02T 10/7275* (2013.01)

(56) References Cited

U.S. PATENT DOCUMENTS

| | | |
|---|---|---|
| 2009/0240387 A1 | 9/2009 | Kawai et al. |
| 2010/0205939 A1 | 8/2010 | Sano et al. |

FOREIGN PATENT DOCUMENTS

| | | |
|---|---|---|
| JP | A-2000-205000 | 7/2000 |
| JP | A-2008-280983 | 11/2008 |
| JP | A-2010-52610 | 3/2010 |
| JP | 2011-225027 A | 11/2011 |
| JP | A-2011-235769 | 11/2011 |
| JP | A-2011-246042 | 12/2011 |
| WO | WO 2007/141984 A1 | 12/2007 |

\* cited by examiner

HYBRID VEHICLE AND METHOD OF CONTROLLING HYBRID VEHICLE

INCORPORATION BY REFERENCE

The disclosure of Japanese Patent Application No. 2012-225796 filed on Oct. 11, 2012 including the specification, drawings and abstract is incorporated herein by reference in its entirety.

BACKGROUND OF THE INVENTION

1. Field of the Invention

The invention relates to engine starting control of a hybrid vehicle.

2. Description of Related Art

In a hybrid vehicle driven by an engine and a motor, control for intermittently starting and stopping the engine during running of the vehicle is performed.

If the engine is intermittently stopped, the engine may be brought into an inappropriate or undesirable combustion state when the engine is started after being stopped, due to fuel deposited and remaining on an intake system of the engine when the engine is stopped. Therefore, it has been proposed to count the number of times the engine is intermittently stopped during running, and reduce the fuel injection amount when the engine is started next time, as the number of times of intermittent stopping increases, so as to provide an appropriate combustion state during starting of the engine (see, for example, Japanese Patent Application Publication No. 2011-235769 (JP 2011-235769 A)).

In a hybrid vehicle in which the engine is started when the vehicle required power exceeds a starting determination value, and the fuel supply amount is feedback-controlled based on a signal of an exhaust oxygen sensor or air-fuel ratio sensor, it has been proposed to reduce the starting determination value and start the engine earlier than usual, when a feedback amount determined from the signal of the exhaust oxygen sensor or air-fuel ratio sensor is equal to or larger than a predetermined value, so as to find a failure of the engine early (see, for example, Japanese Patent Application Publication No. 2010-052610 (JP 2010-052610 A)).

As described in JP 2010-052610A, the air-fuel ratio of exhaust gas is detected by the air-fuel ratio sensor, or the like, mounted in an exhaust system of the engine, and a signal indicative of the air-fuel ratio is fed back for control of the fuel injection amount, flow rate of air, etc. so that an air-fuel mixture is burned at the stoichiometric air-fuel ratio. Since exhaust gas containing a large amount of air is emitted immediately after engine starting, the air-fuel ratio sensor outputs a (lean state) signal indicating a large air-fuel ratio. Then, after the air-fuel ratio is once brought into a state (rich state) smaller than the stoichiometric air-fuel ratio, through the feedback control using the signal from the air-fuel ratio sensor, the air-fuel ratio gradually increases toward the stoichiometric air-fuel ratio, and is finally controlled to the stoichiometric air-fuel ratio. Therefore, it takes a certain period of time from the lean state immediately after engine starting to the time when the air-fuel ratio becomes equal to the stoichiometric air-fuel ratio.

In the meantime, since the engine is stopped and started according to the vehicle required power in the hybrid vehicle, the engine is started and stopped irrespective of the time required to stabilize the air-fuel ratio, if the vehicle required power rapidly changes, such as when the driver stops depressing the accelerator pedal immediately after the driver largely depresses the accelerator to start the engine. As a result, exhaust gas in a condition (lean state) where the air-fuel ratio is larger than the stoichiometric air-fuel ratio, or exhaust gas in a condition (rich state) where the air-fuel ratio is smaller than the stoichiometric air-fuel ratio, remains in the exhaust system after the engine is stopped. The remaining lean-state or rich-state exhaust gas may deteriorate the performance of a catalyst installed in the exhaust system for cleaning up exhaust gas, and the exhaust gas may not be appropriately cleaned up. Also, if the engine is started next time in a condition where exhaust gas whose air-fuel ratio deviates from the stoichiometric air-fuel ratio remains in the exhaust system after the engine is stopped, a period of time for which the air-fuel ratio of exhaust gas keeps deviating from the stoichiometric air-fuel ratio, namely, a period of time it takes the air-fuel ratio of exhaust gas to be stabilized to the stoichiometric air-fuel ratio is prolonged, and, consequently, the fuel efficiency of the engine may be reduced.

SUMMARY OF THE INVENTION

The invention provides a hybrid vehicle that performs control for intermittently starting an engine in a condition close to the stoichiometric air-fuel ratio, and a method of controlling the hybrid vehicle.

A hybrid vehicle according to a first aspect of the invention includes: an engine, a motor configured to drive the vehicle, an air-fuel ratio sensor, and a control unit configured to stop and start the engine according to vehicle required power, the control unit being configured to change a threshold value of the vehicle required power at which the engine is started such that a difference between an air-fuel ratio detected by the air-fuel ratio sensor and a stoichiometric air-fuel ratio decreases in a case where the difference exceeds a predetermined value when the engine is stopped.

In the first aspect of the invention, the control unit may be configured to set the threshold value to a larger value than a reference value, when the air-fuel ratio detected by the air-fuel ratio sensor when the engine is stopped is richer than the stoichiometric air-fuel ratio.

In the second aspect of the invention, the control unit may be configured to set the threshold value to a smaller value than a reference value, when the air-fuel ratio detected by the air-fuel ratio sensor when the engine is stopped is leaner than the stoichiometric air-fuel ratio.

According to a second aspect of the invention, a method of controlling a hybrid vehicle including an engine, a motor configured to drive the vehicle, and an air-fuel ratio sensor, includes: stopping and starting the engine in accordance according to vehicle required power, and changing a threshold value of the vehicle required power at which the engine is started such that a difference between an air-fuel ratio detected by the air-fuel ratio sensor and a stoichiometric air-fuel ratio decreases in a case where the difference exceeds a predetermined value when the engine is stopped.

The first and second aspects of the invention yield an effect that the air-fuel ratio at the time of intermittent starting of the engine can be made close to the stoichiometric air-fuel ratio.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
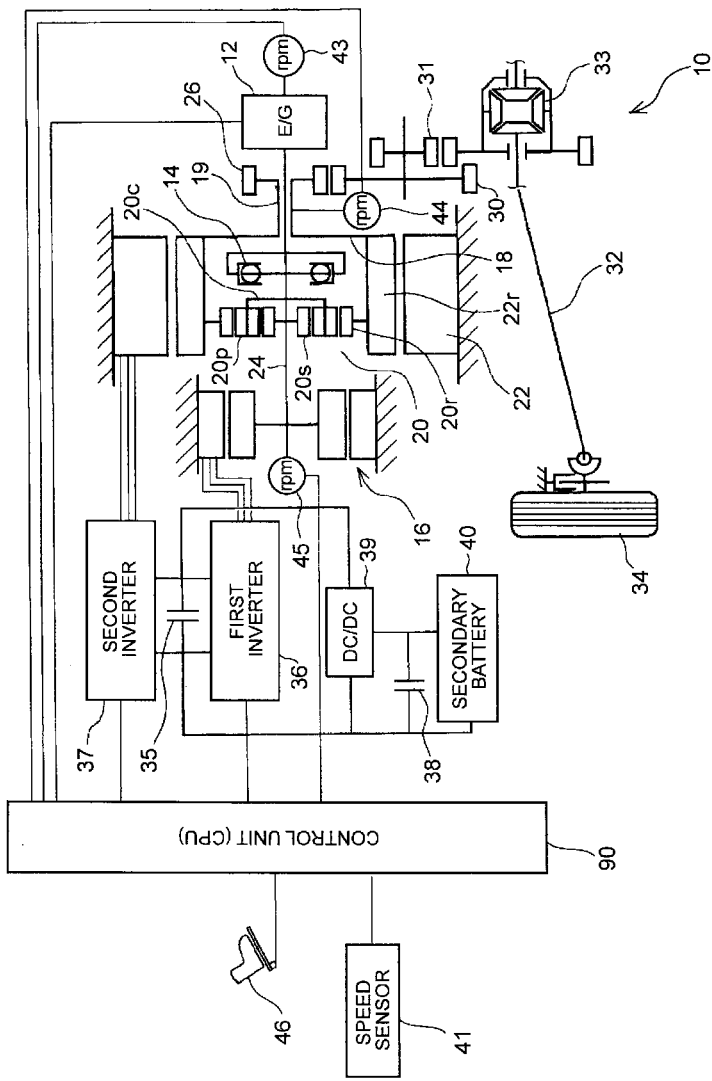
FIG. 1 is a systematic diagram showing the configuration of a system of a hybrid vehicle according to one embodiment of the invention.

A hybrid vehicle according to one embodiment of the invention will be described with reference to the drawings. As shown in FIG. 1, the hybrid vehicle 10 includes an engine 12, a first motor-generator 16, a second motor-generator 22, a power split device 20, and reducing gears 26, 30, 31. The output of the engine 12 is divided into two portions by the power split device 20, and one portion of the output is transmitted to the second motor-generator 22 and wheels, while the other portion is transmitted to the first motor-generator 16. Thus, the power of the engine 12 is transmitted to each wheel 34 via two paths, i.e., a mechanical path and an electrical path.

The power split device 20 consists of a planetary gear set, and distributes torque of the engine 12 to a power output shaft 19 and the first motor-generator 16 at a ratio of gears that constitute the planetary gear set. A rotary shaft of a carrier 20c within the planetary gear set is coupled to the engine 12 via a damper device 14 that absorbs rotational variations, and transmits power of the engine 12 to a radially outer ring gear 20r and a radially inner sun gear 20s via a pinion gear 20p. A rotary shaft 24 of the sun gear 20s is coupled to the first motor-generator 16. The ring gear 20r is directly coupled to a rotor 22r of the second motor-generator 22. A rotary shaft 18 of the rotor 22r is directly coupled to the second motor-generator 22 and the power output shaft 19. The power output shaft 19 is arranged to transmit driving force to a differential gear 33, via the reducing gears 26, 30, 31. The differential gear 33 is connected to the wheel 34 via a drive shaft 32 as a vehicle drive shaft. Thus, rotation of the rotor 22r of the second motor-generator 22 is transmitted via the reducing gears 26, 30, 31 to the drive shaft 32 and the wheel 34 so as to drive the drive shaft 32 and the wheel 34. An accelerator pedal 46 for controlling acceleration of the hybrid vehicle 10 is provided in a cabin of the hybrid vehicle 10.

The hybrid vehicle 10 is provided with first and second inverters 36, 37, a DC/DC converter 39, and capacitors 35, 38 for smoothing current. The first and second inverters 36, 37 convert DC power of a chargeable/dischargeable secondary battery 40, into AC power for driving the motor-generators 16, 22, respectively, and convert AC power generated by the respective motor-generators 16, 22 into AC power for charging the secondary battery 40. The DC/DC converter 39 boosts the voltage of the secondary battery 40 to a voltage for driving the motor-generators, and steps down the voltage generated by the motor-generators to a voltage applied to the secondary battery 40 for charging. The first and second inverters 36, 37 are connected to each other with two connection lines, and the capacitor 35 is provided between the two connection lines. A DC/DC converter 39 is connected to the two connection lines, and a capacitor 38 and the secondary battery 40 are connected in parallel with the DC/DC converter 39.

The engine 12, first motor-generator 16, and the second motor-generator 22 are respectively provided with rotational speed sensors 43, 44, 45 for detecting the rotational speeds thereof. Also, a speed sensor 41 for detecting the vehicle speed is mounted on the hybrid vehicle 10. The speed sensor 41 may detect the vehicle speed by measuring the rotational speed of the wheel 34, or may detect the vehicle speed by another method.

The hybrid vehicle 10 includes a control unit 90 that sets the output of the engine 12, rotational speeds of the respective motor-generators 16, 22, and torque. The control unit 90 is a computer that incorporates CPU and a storage device, such as a memory. The engine 12, rotational speed sensors 43, 44, 45, speed sensor 41, first and second inverters 36, 37, secondary battery 40, and the accelerator pedal 46 are respectively connected to the control unit 90. The control unit 90 receives a state of charge (SOC) of the secondary battery 40, detection signals of the respective sensors 41-45, and the amount of depression of the accelerator pedal 46. The rotational speeds and torque of the engine 12 and the first and second motor-generators 16, 22 are controlled according to commands of the control unit 90.

Figure 2:
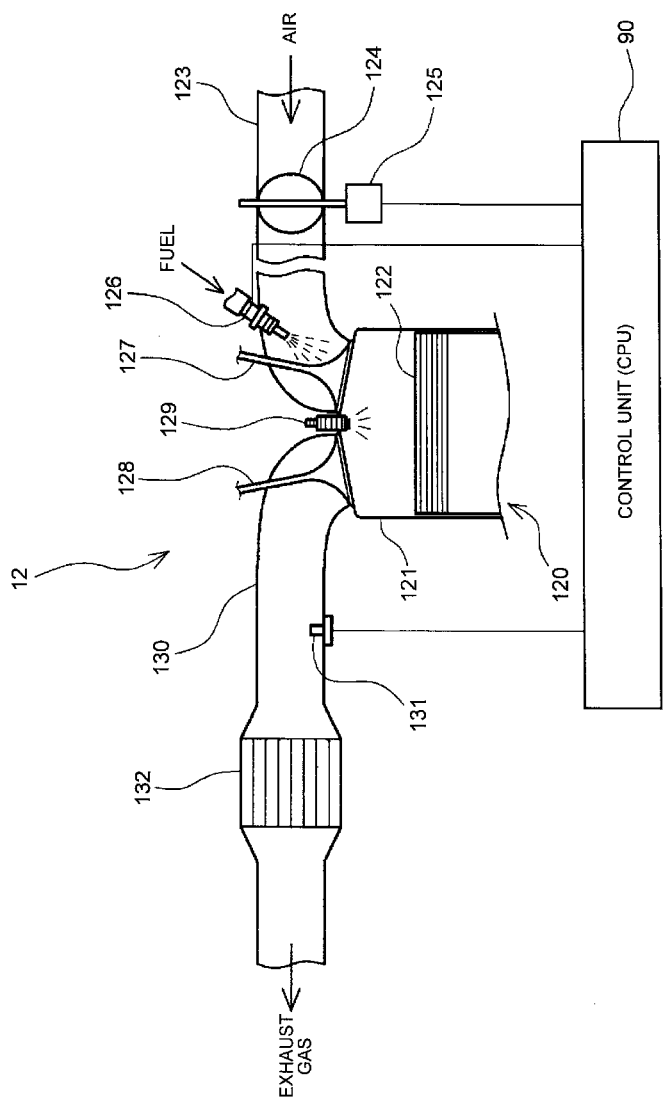
FIG. 2 is a systematic diagram showing a control system of an engine of the hybrid vehicle according to the embodiment of the invention.

As shown in FIG. 2, the engine 12 of the hybrid vehicle 10 includes an internal combustion portion 120 including a cylinder 121, a piston 122 that moves up and down in the cylinder 121, an intake valve 127 and an exhaust valve 128 provided in an upper portion of the cylinder 121, and a spark plug 129 provided in a top portion of the cylinder 121. The engine 12 further includes an intake pipe 123 through which air and fuel to be drawn into the internal combustion portion 120 flow, and an exhaust pipe 130 through which gas resulting from combustion of an air-fuel mixture in the internal combustion portion 120 is discharged. A throttle valve 124 that controls the flow rate of intake air is disposed in the intake pipe 123. The throttle valve 124 is driven (i.e., opened and closed) by an actuator 125. Also, a fuel injection device 126 that injects fuel into air is disposed downstream of the throttle valve 124. A mixture of air and fuel injected by the fuel injection device 126 flows from the intake valve 127 into the cylinder 121. Exhaust gas of the fuel burned in the cylinder 121 is discharged into the exhaust pipe 130 through the exhaust valve 128. An air-fuel ratio sensor 131 that outputs the air-fuel ratio of the exhaust gas based on the oxygen concentration in the exhaust gas is mounted in the exhaust pipe 130. A catalyst 132 that cleans up the exhaust gas by removing nitrogen oxides, carbon monoxide, etc., in the exhaust gas is disposed downstream of the air-fuel ratio sensor 131. The exhaust gas that has passed through the catalyst 132 is released to the atmosphere through the exhaust pipe 130.

As shown in FIG. 2, the actuator 125 of the throttle valve 124, fuel injection device 126, and the air-fuel ratio sensor 131 are connected to the control unit 90. The control unit 90 controls the actuator 125 of the throttle valve 124 and the fuel injection device 126, according to the air-fuel ratio obtained by the air-fuel ratio sensor 131, so that the air-fuel ratio of exhaust gas becomes equal to the stoichiometric air-fuel ratio.

Figure 3A:
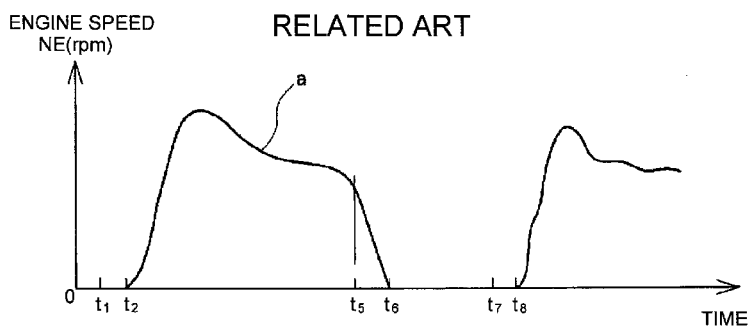
FIG. 3A, FIG. 3B, and FIG. 3C are graphs indicating changes in vehicle required power, engine speed, and air-fuel ratio of a hybrid vehicle according to the related art in which the engine is intermittently started and stopped according to the vehicle required power.

The operation of the hybrid vehicle 10 constructed as described above according to the related art will be described with reference to FIG. 3A-FIG. 3C. If the driver depresses the accelerator pedal 46 shown in FIG. 1 during running of the hybrid vehicle 10, at time $t_1$ indicated in FIG. 3C, the control unit 90 calculates the vehicle required power Pr from the amount of depression of the accelerator pedal 46 and the vehicle speed of the hybrid vehicle 10 obtained from the speed sensor 41. The vehicle required power Pr gradually increases as indicated by a solid line e in FIG. 3C in accordance with depression of the accelerator pedal 46 by the driver. If the vehicle required power Pr exceeds a predetermined threshold value Prs at time $t_2$ indicated in FIG. 3C, the control unit 90 generates a command to start the engine 12. In response to this command, the first motor-generator 16 rotates the engine 12 and starts the engine 12 at time $t_2$ in FIG. 3A. If the engine 12 is started, as indicated by a solid line a in FIG. 3A, the control unit 90 increases the flow rate of intake air and the flow rate of fuel, so as to increase the rotational speed NE of the engine 12. If the rotational speed of the engine 12 becomes equal to or higher than a self-rotation speed at which the engine 12 can rotate by itself, the control unit 90 increases the fuel injection amount and the rotational speed NE as the vehicle required power Pr increases.

Figure 3B:
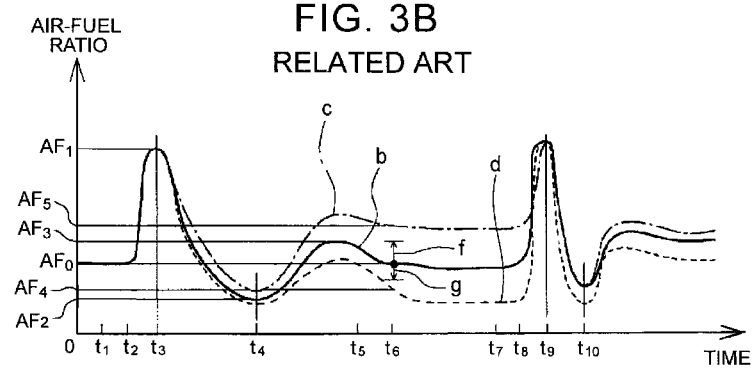

FIG. 3B shows changes of the air-fuel ratio with time after the engine 12 is started. In FIG. 3B, a solid line b represents a reference waveform obtained when the engine 12 starts in a condition where the air-fuel ratio is substantially equal to the stoichiometric air-fuel ratio $AF_0$, and stops in the condition where the air-fuel ratio is substantially equal to the stoichiometric air-fuel ratio $AF_0$. In FIG. 3B, a one-dot chain line c represents a waveform of the air-fuel ratio in the case where the air-fuel ratio deviates to the lean side. In FIG. 3B, a broken line d represents a waveform of the air-fuel ratio in the case where the air-fuel ratio deviates to the rich side. Initially, changes in the actual air-fuel ratio of the engine 12 according to the reference waveform will be described, referring to the reference waveform represented by the solid line b.

Since the oxygen concentration in exhaust gas increases immediately after starting of the engine 12, the actual air-fuel ratio rapidly increases from the stoichiometric air-fuel ratio $AF_0$, in a period from $t_2$ to time $t_3$ in FIG. 3B, and reaches an initial peak air-fuel ratio $AF_1$, as indicated by the solid line b in FIG. 3B. The control unit 90 controls the amount of fuel injected from the fuel injection device 126, and the flow rate of intake air that passes through the throttle valve 124, through feedback control using a signal from the air-fuel ratio sensor 131 disposed in the exhaust pipe 130, so as to reduce the actual air-fuel ratio down to the stoichiometric air-fuel ratio $AF_0$. As a result, the actual air-fuel ratio is reduced from the initial peak air-fuel ratio $AF_1$, and the actual air-fuel ratio is reduced down to a rich peak $AF_2$, at time $t_4$ in FIG. 3B. Then, after the actual air-fuel ratio increases again up to $AF_3$ that is larger than the stoichiometric air-fuel ratio $AF_0$, as indicated by the solid line b in FIG. 3B, the actual air-fuel ratio gradually decreases and approaches the stoichiometric air-fuel ratio $AF_0$. In the meantime, if the driver reduces the pedal effort, i.e., the amount of depression of the accelerator pedal 46 is reduced with a lapse of time, the vehicle required power Pr is gradually reduced, as indicated by the solid line e in FIG. 3C. Then, if the vehicle required power Pr becomes equal to zero at time $t_5$ in FIG. 3C, the control unit 90 generates a command to stop the engine 12. In response to this command, the rotational speed NE of the engine 12 is rapidly reduced, in a period from time $t_5$ to time $t_6$ in FIG. 3A, and the engine 12 stops at time $t_6$ indicated in FIG. 3A. As indicated by the solid line b in FIG. 3B, the actual air-fuel ratio is approximately equal to the stoichiometric air-fuel ratio $AF_0$, at time $t_6$ when the engine 12 stops.

Figure 3C:
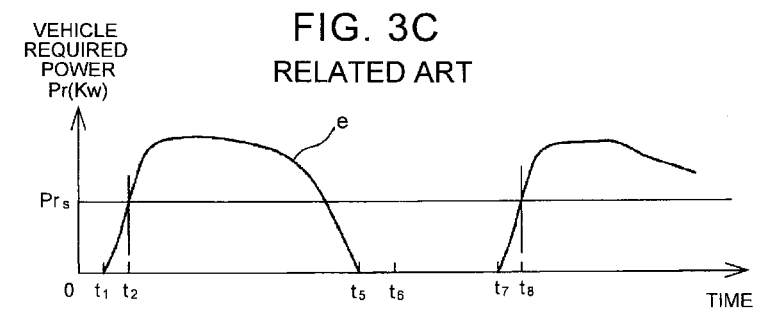

If the driver depresses the accelerator pedal 46 again at time $t_7$ in FIG. 3C, the vehicle required power Pr increases again, as indicated by the solid line e in FIG. 3C. If the vehicle required power Pr exceeds the predetermined threshold value Prs again at time $t_8$ in FIG. 3C, the control unit 90 generates a command to restart the engine 12. As a result, the engine 12 is restarted at time $t_8$ indicated in FIG. 3C, and the rotational speed NE increases. Subsequent to time $t_8$ in FIG. 3B, the actual air-fuel ratio increases again up to a point approximately equal to the initial peak air-fuel ratio $AF_1$, then decreases down to the rich peak $AF_4$ at time $t_{10}$, and then gradually approaches the stoichiometric air-fuel ratio $AF_0$ while fluctuating, as in the period from time $t_2$ to time $t_6$.

Next, the case where the actual air-fuel ratio deviates to the rich side, i.e., the smaller side of the stoichiometric actual air-fuel ratio $AF_0$, after the engine 12 is started will be described. If the engine 12 repeats intermittent stopping and starting, the engine 12 may stop in a condition where an excessively large amount of fuel is deposited on an inner surface of a portion of the intake pipe 123 shown in FIG. 2 located downstream of the fuel injection device 126. In this case, as indicated by the broken line d in FIG. 3B, after the engine 12 is started, the rich peak that appears at time $t_4$ in FIG. 3B is reduced to be smaller than $AF_2$ in the case of the reference waveform as indicated by the solid line b, due to an influence of the excessively large amount of fuel deposited; subsequently, the actual air-fuel ratio varies in a condition where it is smaller (or richer) than that of the reference waveform. Then, at time $t_6$ when the engine 12 stops, the actual air-fuel ratio may become equal to $AF_4$ that is smaller than an air-fuel ratio $(AF_0+g)$ obtained by adding a rich-deviation permissible value g (a negative value) to the stoichiometric air-fuel ratio $AF_0$. Since g is a negative value, $(AF_0+g)$ is smaller than $AF_0$. Then, this condition of deviation to the rich side continues even after the engine 12 stops; therefore, if the engine 12 stops in the condition of deviation to the rich side, the engine 12 is restarted in a condition where the actual air-fuel ratio, which is smaller than $(AF_0+g)$, deviates to the rich side. In this case, even after the engine 12 is restarted, the actual air-fuel ratio is kept smaller than that of the reference waveform represented by the solid line b, as indicated by the broken line d in FIG. 3B. Therefore, the combustion efficiency of the engine 12 is reduced, and the properties of exhaust gas deviate or differ from its typical properties, resulting in deterioration of the performance of the catalyst 132 shown in FIG. 2.

Next, the case where the actual air-fuel ratio deviates to the lean side, i.e., the larger side of the stoichiometric air-fuel ratio $AF_0$, after the engine 12 is started will be described. When the engine 12 transits from a starting mode that only requires rotation of the engine 12, to a starting mode for achieving target torque or power, immediately after the engine 12 is started, or when the engine 12 is restarted after the engine 12 is stopped for a long period of time, the actual air-fuel ratio tends to be larger than an air-fuel ratio $(AF_0+f)$ obtained by adding a lean-deviation permissible value f to the stoichiometric air-fuel ratio $AF_0$, as indicated by the one-dot chain line c in FIG. 3B. At time $t_6$ when the engine 12 stops, the actual air-fuel ratio may be equal to $AF_5$ that is larger than the air-fuel ratio $(AF_0+f)$ obtained by adding the lean-deviation permissible value f to the stoichiometric air-fuel ratio $AF_0$. Since f is a positive value, $(AF_0+f)$ is larger than $AF_0$. Then, this condition of deviation to the lean side continues even after the engine 12 stops; therefore, if the engine 12 stops in the condition of deviation to the lean side, the engine 12 is restarted in a condition where the actual air-fuel ratio, which is larger than $(AF_0+f)$, deviates to the lean side. In this case, even after the engine 12 is restarted, the actual air-fuel ratio is kept larger than that of the reference waveform represented by the solid line b, as indicated by the one-dot chain line c in FIG. 3B. Therefore, as in the case of the deviation to the rich side, the combustion efficiency of the engine 12 is reduced, and the properties of exhaust gas deviate or differ from its typical properties, resulting in deterioration of the performance of the catalyst 132 shown in FIG. 2.

Next, the operation of the hybrid vehicle 10 according to this embodiment will be described with reference to FIG. 4, FIG. 5A, FIG. 5B and FIG. 5C. As described above referring to FIG. 3C, if the driver depresses the accelerator pedal 46 at time $t_{11}$ in FIG. 5C, the vehicle required power Pr increases. If the vehicle required power Pr exceeds an engine-starting-request power reference threshold value $Prs_0$ at time $t_{12}$ in FIG. 5C, the control unit 90 generates a command to start the engine 12, as indicated in step S101 of FIG. 4. In response to this command, the engine 12 starts at time $t_{12}$ in FIG. 5A, and its rotational speed NE increases as indicated by a solid line a in FIG. 5A. The control unit 90 obtains a signal of the air-fuel ratio sensor 131 shown in FIG. 2, as indicated in step S102 of FIG. 4, and stores the air-fuel ratio obtained by the air-fuel ratio sensor 131 and the time at which the air-fuel ratio is obtained, as an actual air-fuel ratio waveform, in the memory of the control unit 90, as indicated in step S103 of FIG. 4. Then, if the driver reduces the pedal effort so as to reduce the amount of depression of the accelerator pedal 46, the vehicle required power Pr becomes equal to zero at time $t_{15}$ in FIG. 5C, and the engine 12 stops at time $t_{16}$ in FIG. 5C. As indicated in step S104 of FIG. 4, the control unit 90 keeps storing the actual air-fuel ratio waveform in the memory even after the engine 12 stops. In normal cases, after the engine 12 starts, the actual air-fuel ratio once increases until time $t_{13}$, then decreases until it reaches a rich peak at time $t_{14}$, and is then controlled toward the stoichiometric air-fuel ratio $AF_0$, according to a reference waveform represented by a solid line b in FIG. 5B. In the case where the air-fuel ratio deviates to the rich side, the actual air-fuel ratio remains in a condition where it is smaller than that of the reference waveform represented by the solid line b, as indicated by a broken line q in FIG. 5B. In the case where the air-fuel ratio deviates to the lean side, the actual air-fuel ratio remains in a condition where it is larger than that of the reference waveform represented by the solid line b, as indicated by a one-dot chain line p in FIG. 5B.

Figure 4:
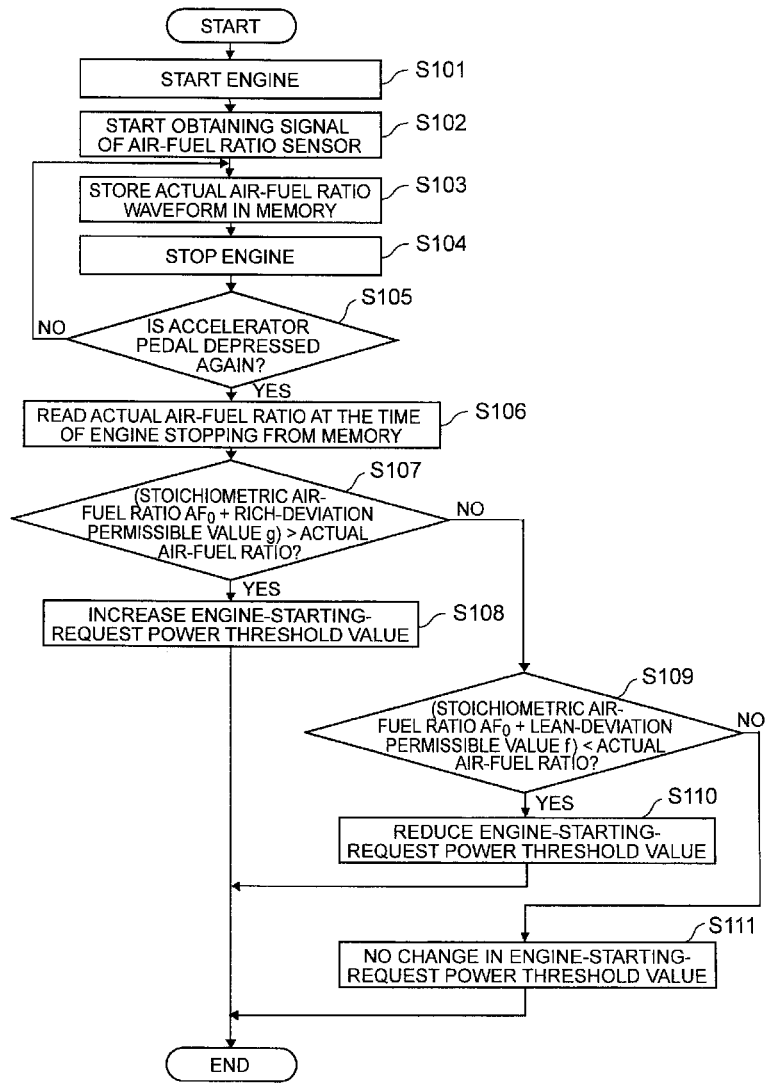
FIG. 4 is a flowchart illustrating the operation of the hybrid vehicle according to the embodiment of the invention.
Figure 5A:
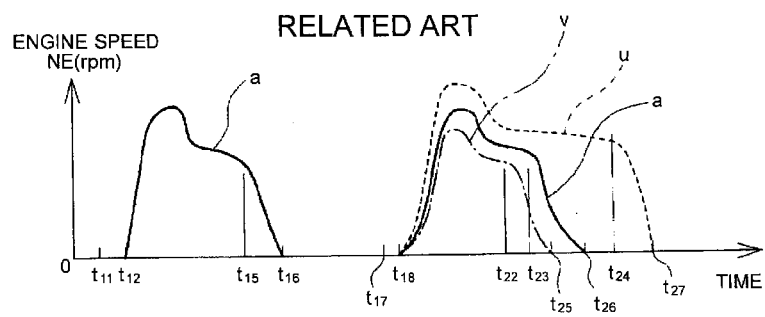
FIG. 5A, FIG. 5B, and FIG. 5C are graphs indicating changes in vehicle required power, engine speed, and air-fuel ratio when the engine is intermittently started and stopped, in the hybrid vehicle of the embodiment of the invention.
Figure 5B:
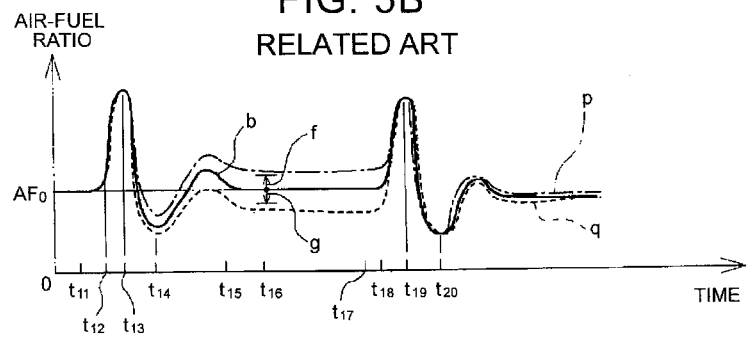
Figure 5C:
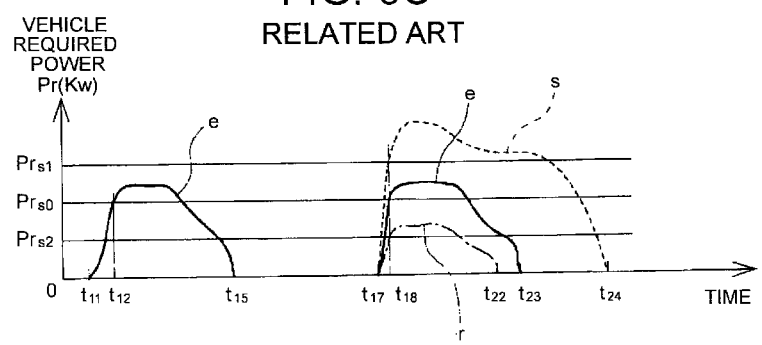

As indicated in step S105 of FIG. 4, if the accelerator pedal 46 is depressed again after time $t_{16}$ in FIG. 5C at which the engine 12 stopped, the control unit 90 determines that the vehicle required power increases, and the engine 12 is to be restarted. Then, as indicated in step S106 of FIG. 4, the control unit 90 stops obtaining the air-fuel ratio from the air-fuel ratio sensor 131, and storing the actual air-fuel ratio waveform in the memory, and reads the actual air-fuel ratio waveform stored in the memory of the control unit 90. Then, as indicated in step S107 of FIG. 4, if a value $(AF_0+g)$ obtained by adding a rich-deviation permissible value g to the stoichiometric air-fuel ratio $AF_0$ is compared with the actual air-fuel ratio detected at time $t_{16}$ in FIG. 5B at which the engine 12 stopped. Since g is a negative value, as explained above, $(AF_0+g)$ is smaller than $AF_0$. Then, as indicated in step S107 of FIG. 4, if the value $(AF_0+g)$ obtained by adding the rich-deviation permissible value g to the stoichiometric air-fuel ratio $AF_0$ is larger than the actual air-fuel ratio (i.e., if the air-fuel ratio is smaller than the value obtained by adding the rich-deviation permissible value g to the stoichiometric air-fuel ratio $AF_0$), namely, if the broken line q shown in FIG. 5B is located below $(AF_0-(absolute\ value\ of\ g))$ or on the rich side thereof, the threshold value of the vehicle required power based on which the engine 12 is started is raised (increased) to a rich-side threshold value $Prs_1$ that is larger than the engine-starting-request power reference threshold value $Prs_0$ normally used for starting the engine 12, as indicated in step S108 of FIG. 4.

If the driver depresses the accelerator pedal 46 by a larger degree, the control unit 90 predicts that the vehicle required power Pr rapidly increases, as indicated by a broken line s from time $t_{17}$ to time $t_{24}$ in FIG. 5C, but does not start the engine 12 while the vehicle required power Pr is between the engine-starting-request power reference threshold value $Prs_0$ and the rich-side threshold value $Prs_1$. During this period, the required power is complemented by increasing the outputs of the first and second motor-generators 16, 22 shown in FIG. 1. Then, the engine 12 is started when the vehicle required power Pr exceeds the rich-side threshold value $Prs_1$. In this manner, the amount of fuel injected into the engine 12 when it is restarted can be reduced. Therefore, the rich-side deviation of the actual air-fuel ratio (excess of fuel) can be corrected, and the actual air-fuel ratio can be made closer to the stoichiometric air-fuel ratio $AF_0$. Also, when the driver requests greater power, the engine 12 eventually needs to be rotated for a longer period of time; therefore, as indicated by a broken line u in FIG. 5A, the start-up period of the engine 12, which is between time $t_{18}$ and time $t_{27}$, becomes longer than the period from time $t_{18}$ to time $t_{26}$ for which the engine 12 is started up when the actual air-fuel ratio varies according to the reference waveform represented by the solid line b. Accordingly, a period of time sufficient to stabilize the actual air-fuel ratio to the stoichiometric air-fuel ratio $AF_0$ can be ensured, and the actual air-fuel ratio is less likely or unlikely to deviate from the stoichiometric air-fuel ratio $AF_0$ when the engine 12 stops next time.

In step S107 of FIG. 4, if the value $(AF_0+g)$ obtained by adding the rich-deviation permissible value g to the stoichiometric air-fuel ratio $AF_0$ is not larger than the actual air-fuel ratio (i.e., if the air-fuel ratio is not smaller than the value obtained by adding the rich-deviation permissible value g to the stoichiometric air-fuel ratio $AF_0$), namely, if the broken line q shown in FIG. 5B is located on or above $(AF_0-(absolute\ value\ of\ g))$, the control unit 90 compares a value $(AF_0+f)$ obtained by adding a lean-deviation permissible value f to the stoichiometric air-fuel ratio $AF_0$ with the actual air-fuel ratio detected at time $t_{16}$ in FIG. 5 at which the engine 12 stopped, as indicated in step S109 of FIG. 4. Since f is a positive value, as explained above, $(AF_0+f)$ is larger than $AF_0$. Then, as indicated in step S109 of FIG. 4, if the value $(AF_0+f)$ obtained by adding the lean-deviation permissible value f to the stoichiometric air-fuel ratio $AF_0$ is smaller than the actual air-fuel ratio (i.e., if the actual air-fuel ratio is larger than the value obtained by adding the rich-deviation permissible value f to the stoichiometric air-fuel ratio $AF_0$), namely, if the one-dot chain line p shown in FIG. 5B is located above $(AF_0+(absolute\ value\ of\ f))$ or on the lean side, the threshold value of the vehicle required power based on which the engine 12 is started is reduced to a lean-side threshold value $Prs_2$ that is smaller than the engine-starting-request power reference threshold value $Prs_0$, as indicated in step S110 of FIG. 4.

Then, the engine 12 starts if the driver depresses the accelerator pedal 46 only by a small degree, namely, immediately after the vehicle required power Pr exceeds the lean-side threshold value $Prs_2$ that is smaller than the engine-starting-request power reference threshold value $Prs_0$, as indicated by a one-dot chain line r from time $t_{17}$ to time $t_{22}$ in FIG. 5C. Namely, even if the power requested by the driver is so small that the engine 12 may be stopped after a short period of time, the required power is not complemented by increasing the outputs of the first and second motor-generators 16, 22, but by starting the engine 12, so that the amount of fuel injected into the engine 12 is increased, and the actual air-fuel ratio is directed toward the rich side. Therefore, the lean-side deviation of the air-fuel ratio (shortage of fuel) can be corrected, and the actual air-fuel ratio can be made close to the stoichiometric air-fuel ratio $AF_0$.

When the value $(AF_0+g)$ obtained by adding the rich-deviation permissible value g to the stoichiometric air-fuel ratio $AF_0$ is not larger than the actual air-fuel ratio, and the value $(AF_0+f)$ obtained by adding the lean-deviation permissible value f to the stoichiometric air-fuel ratio $AF_0$ is not smaller than the actual air-fuel ratio, namely, when the actual air-fuel ratio detected at time $t_{16}$ when the engine 12 is stopped is between $(AF_0+(\text{absolute value of } f))$ and $(AF_0-(\text{absolute value of } g))$ in FIG. 5B, the control unit 90 determines that the actual air-fuel ratio is within a range between the lean-side and rich-side permissible values, and does not change the threshold value of the vehicle required power based on which the engine 12 is started, as indicated in step S111 of FIG. 4.

As explained above, the hybrid vehicle 10 of this embodiment changes the threshold value of the vehicle required power based on which the engine 12 is started, immediately before the engine 12 is started, or when the accelerator pedal 46 is depressed after the engine 12 is stopped, so as to make the actual air-fuel ratio after starting of the engine 12 close to the stoichiometric air-fuel ratio $AF_0$, and curb reduction of the combustion efficiency of the engine 12. Further, the hybrid vehicle 10 of this embodiment can keep the properties of exhaust gas in normal conditions, so as to curb deterioration of the performance of the catalyst 132.

In the above-described embodiment, this invention is applied to the hybrid vehicle 10 in which the power of the engine 12 is divided by the power split device 20 and distributed to the first and second motor generators 16, 22, and the outputs of both of the engine 12 and the second motor-generator 22 are used for driving the wheel 34, as shown in FIG. 1. However, the invention may also be applied to the hybrid vehicle 10 in which the engine 12 is intermittently started and stopped during running of the vehicle in a different manner from that of the embodiment as shown in FIG. 1. For example, the invention may be applied to a series type hybrid vehicle in which the engine 12 is used only for generating electric power, and the motors are used only for driving the wheels and regeneration. The invention may also be applied to a parallel type hybrid vehicle in which the engine drives the wheels and drives a generator at the same time via a transmission, and stored electric energy is transferred to a motor and used for running the vehicle.

What is claimed is:

1. A hybrid vehicle comprising:
an engine;
a motor configured to drive the hybrid vehicle;
an air-fuel ratio sensor; and
a control unit including a storage device storing a program that, when executed by the control unit, causes the control unit to:
control the engine to start and stop, and
when the engine is stopped:
obtain a current air-fuel ratio detected by the air-fuel ratio sensor;
determine a difference between the current detected air-fuel ratio and a stoichiometric air-fuel ratio;
when the determined difference exceeds a predetermined value, change a threshold value of the vehicle required power at which the engine is started; and
control the engine to restart when the vehicle required power exceeds the changed threshold value.

2. The hybrid vehicle according to claim 1, wherein the control unit is configured to set the threshold value to a value larger than a reference value, when the current air-fuel ratio detected by the air-fuel ratio sensor when the engine is stopped is richer than the stoichiometric air-fuel ratio.

3. The hybrid vehicle according to claim 1, wherein the control unit is configured to set the threshold value to a value smaller than a reference value, when the current air-fuel ratio detected by the air-fuel ratio sensor when the engine is stopped is leaner than the stoichiometric air-fuel ratio.

4. A method of controlling a hybrid vehicle including an engine, a motor configured to drive the hybrid vehicle, and an air-fuel ratio sensor, comprising:
controlling the engine to start and stop; and
when the engine is stopped:
obtaining a current air-fuel ratio detected by the air-fuel ratio sensor;
determining a difference between the current detected air-fuel ratio and a stoichiometric air-fuel ratio;
when the determined difference exceeds a predetermined value, changing a threshold value of the vehicle required power at which the engine is started; and
controlling the engine to restart when the vehicle required power, exceeds the changed threshold value.

5. A hybrid vehicle comprising:
an engine;
a motor configured to drive the hybrid vehicle;
an air-fuel ratio sensor;
a memory; and
a processor configured to execute a program stored in the memory, the program, when executed by the processor, causing the processor to:
control the engine to start and stop; and
when the engine is stopped:
obtain a current air-fuel ratio detected by the air-fuel ratio sensor;
determine a difference between the current detected air-fuel ratio and a stoichiometric air-fuel ratio;
when the determined difference exceeds a predetermined value, change a threshold value of the vehicle required power at which the engine is started; and
control the engine to restart when the vehicle required power exceeds the changed threshold value.

* * * * *